Aug. 24, 1926.
C. B. BAILEY
GASKET
Filed June 29, 1925
1,597,040
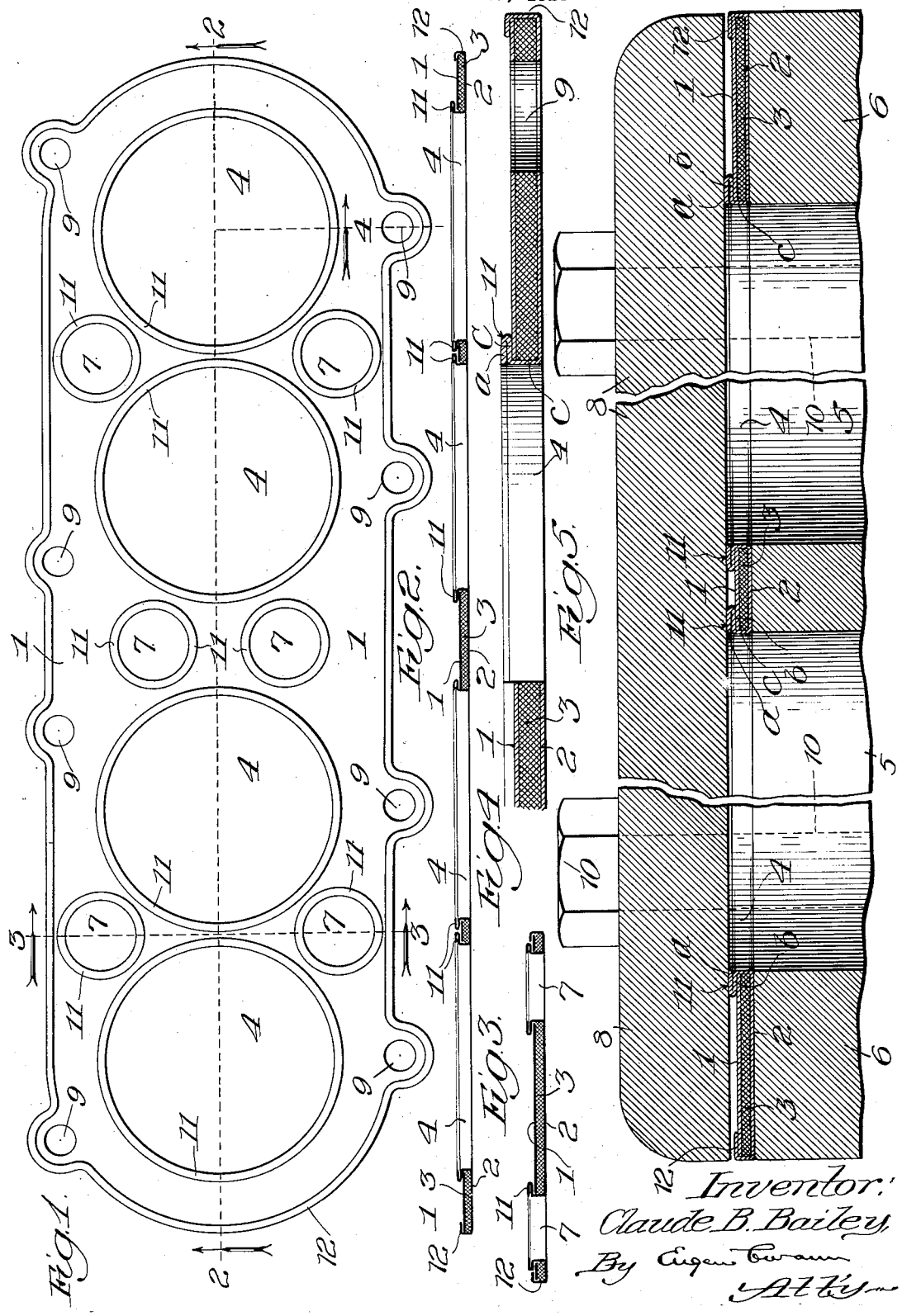
Inventor:
Claude B. Bailey,
By Eugene Cwann
Atty Patented Aug. 24, 1926.

1,597,040

UNITED STATES PATENT OFFICE.

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE.

GASKET.

Application filed June 29, 1925. Serial No. 40,175.

This invention relates to cylinder head and other gaskets which are composed of outer layers or facings of sheet metal and an interposed layer of asbestos or other packing material.

Such gaskets as heretofore generally made have had all portions thereof in the same plane, resulting in wasting the clamping pressures exerted on the gaskets by distributing such pressures over the entire areas of the gaskets, thus requiring considerable pressures and a substantially even application of the same entirely over the gaskets to obtain tight joints especially at places of high pressures, as in cylinders of internal combustion engines.

In accordance with my invention, I employ in connection with gaskets of the kind mentioned a folded annular member of sheet metal about each of the port holes and not elsewhere, so that the pressures exerted on the gaskets when clamping them in place will be concentrated on and confined to these annular members, thus obtaining tight joints with less pressure than heretofore with gaskets of this general kind.

An object of my invention is to integrally connect these annular members with one of the metal layers of the gasket body about the respective port holes to provide a more simple and durable construction.

The invention consists further in the matters hereinafter described and claimed.

In the accompanying drawings—

Fig. 1 is a plan view of a cylinder head gasket constructed in accordance with my invention;

Figs. 2 and 3 are sectional views taken on lines 2—2 and 3—3, respectively, of Fig. 1;

Fig. 4 is an enlarged fragmentary sectional view taken on the indirect line 4—of Fig. 1; and Fig. 5 is an enlarged vertical sectional view showing the gasket clamped in place between a cylinder block and its head.

The gasket shown in the drawings has a body portion composed of three overlapping layers of gasket material, there being two outer layers 1, 2 of relatively thin sheet metal, such as copper, brass, aluminum, zinc, or the like, and an interposed layer 3 of asbestos or other packing material.

Said gasket when of the cylinder head type has a plurality of relatively large separated holes or openings 4, 4 in the gasket body and spaced apart lengthwise thereof with the holes of the same size and arranged to fit about the cylinder bores 5, 5 in the cylinder block 6, as shown in Fig. 5. As shown in Fig. 1, the body is further provided with a plurality of smaller port holes 7, 7 also of the same size and arranged to fit about the registering water passages (not shown) in the block 6 and its head 8, as shown.

The gasket shown is designed for use with a four cylinder internal combustion engine with overhead valves, such as employed in Chevrolet cars. It is to be of course understood that the gaskets of my invention may be designed for six and more cylinder motors and with other valve arrangements without departing from the spirit and scope of my invention.

The gasket has other holes 9, 9 to receive bolts or studs 10, 10 for clamping the gasket between the cylinder block and its head, as shown in Fig. 5; said holes 9, 9 in the gasket shown being arranged along the opposite side margins of the gasket to conform with the stud arrangement of the particular installation for which the gasket is designed.

Around each of the port holes 4 and 7, I provide a relatively narrow annular member 11 of sheet metal. These members 11 are connected with one of the metal layers of the gasket and are preferably on one side of the gasket body to be out of the plane thereof and increase the thickness of the gasket body immediately about each of said port holes. On clamping the gasket between the block 6 and head 8, the pressure exerted by the studs or bolts 10 is concentrated on and confined to the members 11 and the portions of the gasket body immediately at the same, so that less pressure is required to make tight joints by not wasting the clamping pressure by distributing it over the entire area of the gasket body, as heretofore.

This is an important feature of my invention because it enables tight joints to be had immediately at and surrounding the port holes with less pressure than heretofore. This allows smaller studs or bolts to be used, or the same size studs as now in general use may be employed with less strain or tension on them, to provide tight joints even for high pressures as developed in internal combustion engines.

As shown in the drawings, the members 11 are formed integral with one of the metal layers of the gasket, preferably the layer 2 which is on the side opposite to the members 11. Moreover, each member 11 is folded on itself to provide a plurality of superimposed folds or layers $a$, $b$ preferably parallel to each other and to the plane of the gasket body. The layer 2 is provided with flanges $c$ extending through the port holes 4 and 7 in the other layers 1 and 3, with the innermost folds or layers $b$ of the members 11 integrally connected therewith. This is accomplished by bending the metal of the layer 2 at these ports into the shape required for the flanges $a$ to $c$, as shown.

The outer edge of the gasket body is bound by a flange 12 integral with the layer 2 and folded over the outer edge of the other layers 1 and 3, as shown.

The type of gasket and the details of structure and arrangement of parts thereof may be variously changed and modified without departing from the spirit and scope of my invention.

I claim as my invention:

1. A gasket having a body with a port hole therein and composed of outer layers of sheet metal and an interposed layer of fibrous material, and a relatively narrow pressure receiving annular member of sheet metal about the port hole on one side of the gasket body and out of the plane thereof, said member being connected with one of the metal layers of the gasket body and having a plurality of superimposed layers parallel to each other and to the gasket body.

2. A gasket having a body with a port hole therein and composed of outer layers of sheet metal and an interposed layer of fibrous material, and a relatively narrow pressure receiving annular member of sheet metal about the port hole on one side of the gasket body and out of the plane thereof, said member being integrally connected with the metal layer on the opposite side of the body by a flange extending through the port hole and surrounding the same, said member being in folded form to provide superimposed layers parallel to each other and to the gasket body.

3. A gasket having an elongated body with a plurality of port holes therein spaced apart lengthwise of the body and composed of outer layers of sheet metal and an interposed layer of fibrous material, and a plurality of relatively narrow pressure receiving annular members of sheet metal about said port holes on one side of the gasket body and out of the plane thereof, said members being connected with one of the metal layers of the gasket body and having a plurality of superimposed layers parallel to each other and to the gasket body.

4. A cylinder head gasket having a body with a plurality of port holes therein and composed of outer layers of sheet metal and an interposed layer of asbestos, and relatively narrow pressure receiving annular members of sheet metal about said port holes on one side of the gasket body and out of the plane thereof, said members being integrally connected with the metal layer on the opposite side of the body by flanges extending through the respective port holes, said members being in folded form to provide superimposed layers parallel to each other and to the gasket body.

5. A cylinder head gasket having a body with a plurality of port holes therein and composed of outer layers of sheet metal and an interposed layer of asbestos, and relatively narrow pressure receiving annular members of sheet metal about said port holes on one side of the gasket body and out of the plane thereof, said members being integrally connected with one of said metal layers and in folded form to provide a plurality of superimposed layers parallel to each other and to the gasket body, and a binding flange on one of the outer metal layers and turned over the outer edges of the other layers In testimony whereof I affix my signature this 24 day of June, 1925.

CLAUDE B. BAILEY.